United States Patent
Arndt et al.

(10) Patent No.: US 7,396,515 B2
(45) Date of Patent: Jul. 8, 2008

(54) REACTOR FOR THE TREATMENT OF A SAMPLE MEDIUM

(75) Inventors: Frank Arndt, Berlin (DE); Hendrik Rönsch, Berlin (DE); Arno Steckenborn, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 658 days.

(21) Appl. No.: 10/445,187

(22) Filed: May 27, 2003

(65) Prior Publication Data
US 2004/0013584 A1  Jan. 22, 2004

(30) Foreign Application Priority Data
May 27, 2002 (DE) .................... 102 24 150

(51) Int. Cl.
*B01J 19/08* (2006.01)
(52) U.S. Cl. .............. 422/186; 422/213; 422/224
(58) Field of Classification Search ........... 422/186, 422/213, 224; 417/92
See application file for complete search history.

(56) References Cited

U.S. PATENT DOCUMENTS

| | | | | |
|---|---|---|---|---|
| 5,222,808 A | * | 6/1993 | Sugarman et al. | ......... 366/274 |
| 6,017,696 A | | 1/2000 | Heller | |
| 6,143,496 A | * | 11/2000 | Brown et al. | .............. 435/6 |
| 6,238,909 B1 | | 5/2001 | Choong et al. | |
| 6,415,821 B2 | * | 7/2002 | Kamholz et al. | ........... 137/827 |
| 6,492,175 B1 | | 12/2002 | Muller et al. | |
| 6,542,778 B1 | | 4/2003 | Fuhr et al. | |
| 6,610,186 B1 | * | 8/2003 | Mayer et al. | ............... 204/451 |

FOREIGN PATENT DOCUMENTS

| | | |
|---|---|---|
| DE | 37 35 397 A1 | 5/1989 |
| DE | 198 23 047 C1 | 5/1998 |
| EP | 0 313 008 B1 | 4/1989 |
| EP | 1 098 956 B1 | 11/2002 |
| FR | 2 781 500 A1 | 1/2000 |
| WO | WO 00/37628 A1 | 6/2000 |
| WO | WO 01/18168 A1 | 3/2001 |

OTHER PUBLICATIONS

Autoclave multireactor systems for small volumes, 300-500 ml, Infors AG Switzerland, 2003.

* cited by examiner

*Primary Examiner*—Kishor Mayekar
(74) *Attorney, Agent, or Firm*—Young & Thompson

(57) ABSTRACT

A reactor with a reaction chamber (14), which is produced for example by etching or other micro-mechanical production processes. An agitating device (20) is formed for example by an electrical field generator (18), which acts on electrical charge carriers (21) of the sample fluid, and consequently leads to circulation or mixing of the sample fluid. As an alternative, a magnetic field generator which acts on magnetic particles in the sample fluid may also be used. The reactor permits the extensive miniaturization of test reactors for bioprocesses, since circulation of the fluid to achieve a quasi steady-state bioprocess is possible the agitating devices even under extremely confined spatial conditions.

3 Claims, 2 Drawing Sheets

REACTOR FOR THE TREATMENT OF A SAMPLE MEDIUM

BACKGROUND OF THE INVENTION

Figure 1:
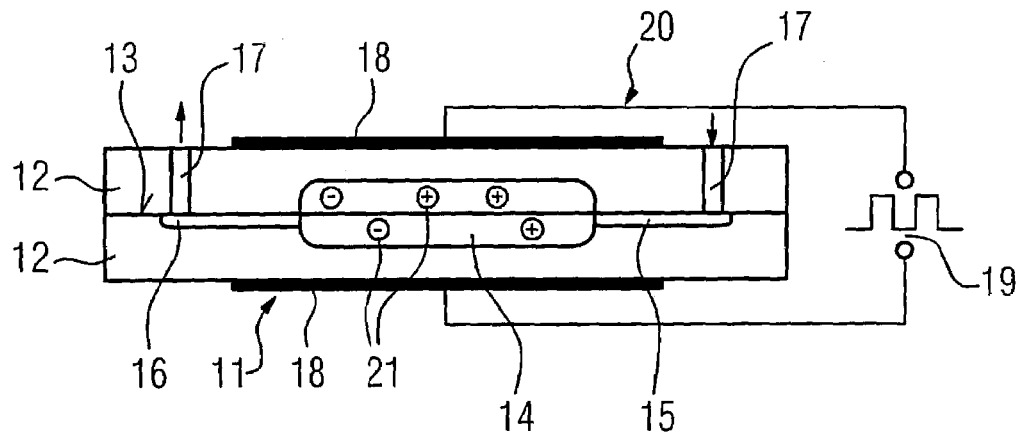

Reactors for the treatment of a sample medium are used for example for carrying out bioprocesses, meaning the obtainment of products by biochemical reactions. If such bioprocesses are to be used on an industrial scale, the sequence of the bioprocess must be precisely investigated in advance, in order to accomplish the highest possible efficiency of the bioprocess by choosing suitable process parameters. This procedure is referred to as upstream processing.

An installation which allows the bioprocess to be carried out under laboratory conditions is required for the upstream processing. Such an installation, referred to as a table-top fermenter, is offered for example by Infors AG, who on Oct. 25, 2001 described their product under the model name "Sixfors" on the Internet page www.infors.ch/d/d5a.htm. According to the illustration published on this Internet page, "Sixfors" comprises a base station, on which a bioprocess can be carried out simultaneously in six beakers, under modified conditions in each case. As disclosed by the text describing "Sixfors", these beakers have agitating shaft inserts (which can be seen in the illustration). Additionally provided are drives with a magnetic coupling, which can move agitating magnets which are shown in the drawing and are located on the bottom of the beakers.

The two agitating devices mentioned provide constant circulation of the reaction fluid while the bioprocess is being conducted, whereby a quasi steady-state bioprocess can be maintained. This process largely corresponds to the conditions during industrial-scale use. The quasi steady state is referred to as fed-batch, meaning that the bioprocess is maintained by constant feeding of reaction fluid on the one hand and removal of the reaction product on the other hand.

SUMMARY OF THE INVENTION

The invention is based on the object of providing a reactor for the determination of the process parameters of a bioprocess with which a comparatively efficient determination of these process parameters is possible.

To achieve this object, the invention provides a reactor with a reactor chamber of a micro-mechanical type of construction for a sample medium containing electrical charge carriers and with a generator for an electrostatic field which is effective in the interior of the reaction chamber and is cyclically reversed in its polarity and/or locally varied.

The micro-mechanical type of construction of the reactor presupposes that it is produced by means of micro-mechanical production processes. This can be performed for example by micro-milling. In a particularly preferred way, the reactor can also be produced by etching the reaction chamber and also inlets and outlets for the sample medium into a substrate, for example a silicon wafer.

As soon as the generator generates an electric field, the latter acts in the interior of the reaction chamber on the electrical charge carriers contained in the sample medium, whereby their state of motion is influenced. This ensures a function as an agitating device, since the electrical charge carriers move with a different motion pattern than the remaining particles contained in the sample medium. The cyclical reversal of polarity and/or local variability of the electrostatic field in this case ensures the prevention of an undesired segregation effect, which could be brought about by a migration of the charge carriers in an electric field that is constant over a prolonged period of time. The cycle times for the polarity reversal may, for example, lie in the range of one or more seconds.

The described circulating effect in the sample medium has the major advantage that it can also be used in extremely small reaction chambers. Consequently, a circulation of the sample medium also becomes possible in reactors of a micro-mechanical type of construction, in which the agitating devices described above, comprising agitating shaft inserts or agitating magnets, cannot be used for reasons of space. This advantageously makes possible a great miniaturization of the reactors for carrying out the upstream processing, for example for a bioprocess. The miniaturization allows the reactor to be operated with extremely small amounts of the sample medium. As a result, a high degree of parallelization becomes possible, that is to say the bioprocess can be carried out simultaneously in a large number of reactors with a slight modification of the process parameters in each case, without the consumption of sample medium increasing too much. The time spent on upstream processing can also be drastically reduced, thereby advantageously permitting rapid commercial exploitation of a bioprocess investigated.

According to an advantageous refinement of the invention, the generator has at least one pair of electrodes.

In the case of this embodiment, cyclical polarity reversal of the electric field can be easily achieved by a polarity reversal of the pair of electrodes, local variability by the use of a number of pairs of electrodes and activation at staggered times.

One advantageous refinement of the invention provides that, in the case of an elongate reaction chamber, a number of pairs of electrodes are nested one inside the other along its length. These pairs are activated alternately, in this way achieving a local variation of the electrostatic field formed in the interior of the reaction chamber. By corresponding nesting, a migrating electric field can be advantageously generated, nesting allowing the field to be passed on from one pair of electrodes to the next. Consequently, the migrating field can be advantageously used for the targeted generation of uniform states of motion of the charge carriers in the sample medium.

Another advantageous refinement of the invention provides that the electrodes are formed by a layer on the reaction chamber. This layer may be formed both in the chamber interior and outside on the chamber wall. Insofar as the layer is formed in the interior of the reaction chamber and is not separated from the sample medium by an insulating layer, the forming of an electrochemical reaction is minimized by the cyclical polarity reversal of the electrostatic field. Particularly simple production of the electrodes is advantageously possible by means of the coating. These electrodes can for example be applied to the chamber walls of the reaction chamber by a coating by means of sputtering. Such a process can be favorably combined with other micro-mechanical processes for producing the reaction chamber. The thickness of the coatings applied in this way thereby restricts the volume of the chamber only insignificantly when the layer is formed in the interior of the chamber, which is beneficial for the micro-mechanical type of construction of the reactor.

According to an alternative solution achieving the object stated at the beginning, the invention provides a reactor with a reactor chamber of a micro-mechanical type of construction for a sample medium containing magnetic particles and with a generator for a magnetic field which is effective in the interior of the reaction chamber and is cyclically reversed in its polarity and/or locally varied.

The advantage of this refinement of the reactor is that any desired sample media can be investigated in the reaction chamber, that is also sample media which contain no charge carriers. Added to the sample medium in their place are magnetic particles, which can be influenced in their state of motion by the generator for the magnetic field. Consequently, the magnetic particles assume the function of providing circulation of the sample medium, because the state of motion of the magnetic particles differs from that of the sample medium.

The magnetic particles are chosen to be so small in their size that they can move freely in the reaction chamber of the reactor, that is to say clogging of the reaction chamber is ruled out. The particles may, for example, be produced from the generally known hard-magnetic materials. The use of magnetizable complex compounds is also conceivable.

The magnetic particles advantageously behave neutrally with respect to the biochemical reactions occurring in the sample medium. In order to avoid chemical reactions with the sample medium, these magnetic particles may be additionally provided with a resistant layer, for example of ceramic or plastic.

According to one refinement of this invention, the generator is a rotating magnet. The rotation of the magnet leads to a local variation of the magnetic field. The magnet may, for example, be made in the form of a permanent magnet. The construction of the field generator can in this case be kept simple. In particular, commercially available magnetic drives for magnetic agitators can be used, which do not have to be integrated into the micro-mechanical construction of the reaction chamber and open up the possibility of bringing a number of reaction chambers arranged in parallel simultaneously into the magnetic field of the magnetic drive.

Another refinement of this invention provides that, in the case of an elongate reaction chamber, a number of electrical magnetic coils are arranged as generators one after the other along its length. Variation of the magnetic field over time can then be performed by simple switching on and off of the electromagnets formed in this way. In this case, no mechanical, movable parts are necessary, so that the electromagnet can be advantageously integrated into the micro-mechanical construction of the reaction chamber. A simple and robust construction of the generator can also be realized, however, in the case of external arrangement of the electromagnet.

According to a particularly advantageous refinement of the two inventions, the reaction chamber is formed in an annular manner.

This is of particular advantage both in the case of generators for electric fields and for magnetic fields, since the charge carriers or magnetic particles can run around in the annular reaction chamber and, consequently, efficient circulation of the sample medium is ensured. This can be achieved by the magnetic and/or electric field circulating in the reaction chamber. In this case, the running-around of the particles influenced by the field can be achieved in the reactor in a particularly simple way.

BREIF DESCRIPTION OF THE DRAWINGS

Figure 2:
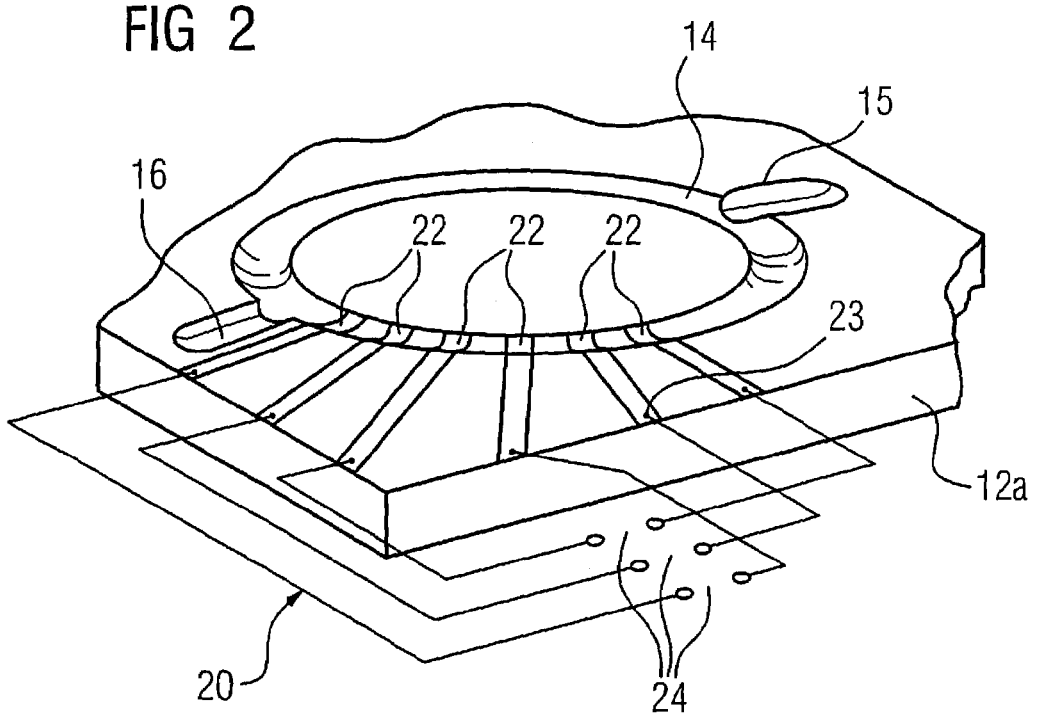
Figure 3:
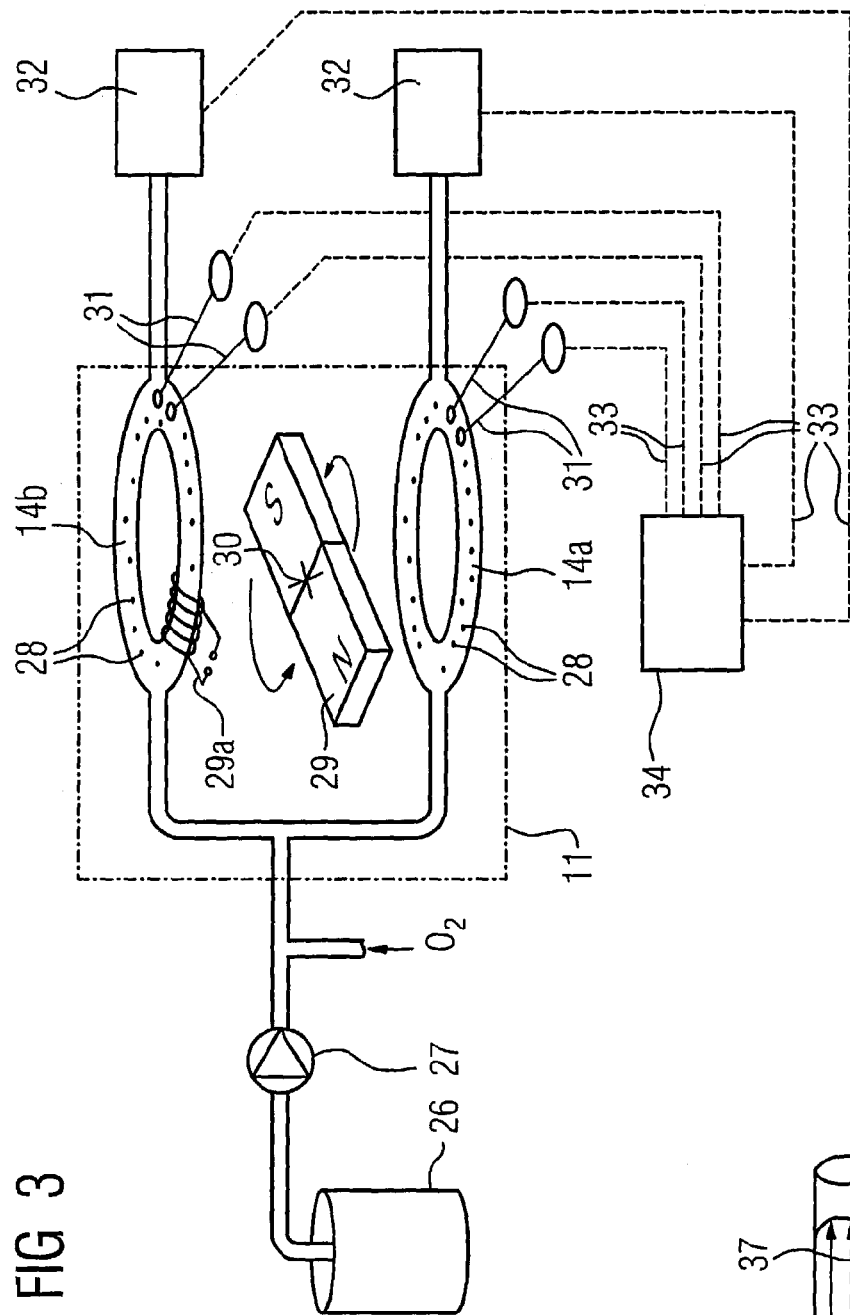
Figure 4:
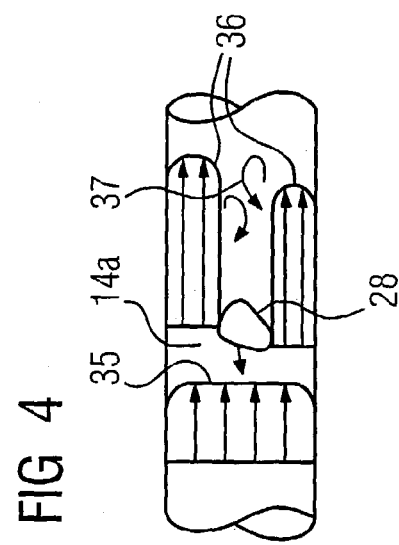

Further details of the invention can be taken from the drawing, in which:

FIG. 1 shows the schematic longitudinal section through an exemplary embodiment of a micro-reactor, FIG. 2 shows an exemplary embodiment of a reaction chamber formed in an annular manner in a perspective view, FIG. 3 shows the schematic construction of an analysis device, in which an exemplary embodiment of annular reaction chambers is used, as a block diagram, and FIG. 4 schematically shows the flow profile of the sample fluid in a reaction chamber with magnetic particles.

DETAILED DESCRIPTION OF THE INVENTION

A reactor 11 is formed by bonding of two silicon wafers 12, the structures forming the reactor being formed in a separating joint 13 between the silicon wafers 12 by etching into the surfaces facing each other of the silicon wafers 12. This produces a reaction chamber 14, the volume of which can be made in any form desired, for example cylindrical. Leading off from this reaction chamber are an inlet channel 15 and outlet channel 16, it being possible for these channels to be connected to channel structures (not represented) for the feeding or discharging of the sample medium via passages 17 in one of the silicon wafers 12.

Provided on the two sides of the silicon wafers 12 facing away from the separating joint 13 is a metallic coating 18, which together with an electrical voltage source 19 forms a generator 20 for an electric field between the coatings acting as capacitor plates, it also being possible for the purposes of the invention to refer to these capacitor plates as electrodes. The reaction chamber 14 is located between the coatings 18, so that charge carriers 21, which form constituents of the sample fluid located in the reaction chamber, are influenced in their state of motion. As a result, a circulation of the sample fluid is achieved. The polarity of the coating 18 is reversed at regular time intervals—as indicated—(interval for switching over, for example, 10 s).

Represented in FIG. 2 is a silicon wafer 12a, which merely forms one half of a reactor corresponding to the type of construction according to FIG. 1. As a difference from FIG. 1, the reaction chamber 14 is formed in an annular manner. The generator 20 in this case comprises pairs of electrodes 22 nested one inside the other, with associated contacting paths 23 and voltage sources 24. A voltage can be applied to the pairs of electrodes 22 respectively one after the other, so that the nesting of the pairs of electrodes causes the electric field formed between the respective pairs of electrodes to circulate in the annular reaction chamber, in that it is, as it were, passed on from one pair of electrodes to the other.

In order to generate a circulating field, it is of course necessary for the nested pairs of electrodes to be arranged in the entire reaction chamber. The three pairs of electrodes 22 represented are intended merely by way of example to represent the mechanism.

The pairs of electrodes 22 are formed by strip-like metal layers 25, which on the one hand form the contacting paths 23 outside the annular reaction chamber 14 and on the other hand form the pairs of electrodes 22 within the annular reaction chamber 14. To avoid interactions with the sample fluid, the pairs of electrodes 22 may be produced from high-grade metals, in particular gold or platinum, or be provided with an additional insulating coating.

FIG. 3 reveals how a reactor 11, the system limits of which are indicated by a dash-dotted line, can be combined with further system components in order to simulate a bioprocess. The sample fluid is fed from a store 26 by means of a pump 27 to various reaction chambers 14a, b. As indicated, this fluid may for example be mixed with oxygen. Different process parameters can be set in the reaction chambers 14a, b, so that a number of batches for the sample fluid can be investigated simultaneously. The number of reaction chambers is not restricted to two of course. In particular in the case where the reaction chamber is formed by etching into a number of wafers, said wafers can be arranged in layers to form a block, whereby a large number of reaction chambers can be realized in a very small space.

The sample fluid is also provided with magnetic particles 28, which are either already admixed to the store 26 or introduced directly into the reaction chambers 14a, b, where they are held by suitable filters or screens (not represented). A generator 29 for a magnetic field comprises a permanent magnet, which is rotatable about a center 30 in a way corresponding to the arrows indicated and, consequently, generates a circulating magnetic field in the reaction chambers 14a, b. This magnetic field also sets the magnetic particles 28 in motion. The magnetic particles 28 provide constant circulation of the sample fluid in the reaction chambers 14a, b, allowing a quasi steady state to be established in them.

As an alternative to the permanent magnet 29, electrical coils may be arranged on the reaction chambers, the coil 29a being represented by way of example. These coils may be arranged in numbers, in order to generate a circulating magnetic field in a way corresponding to the mechanism explained with respect to FIG. 2.

While the bioprocess is being conducted, the process parameters are monitored by microprobes 31. The pH or the oxygen concentration in the reaction chamber can be determined, for example, by means of the microprobes 31. Furthermore, the sample fluid removed from the reaction chambers 14a, b is precisely investigated in the analysis module 32, to obtain information on the desired reaction products. The data collected in the analysis module 32 and the microprobes 31 are collected by means of signal lines 33 in an evaluation unit 34 and can be called up from the latter.

Represented schematically in FIG. 4 is the circulating mechanism which is achieved by the magnetic particles 28 in the annular channel of the reaction chamber 14a, according to FIG. 3. The small dimensions of the micro-mechanically produced reaction chamber have the effect that the undisturbed flow profile 35 is formed in a very uniform, i.e. laminar, manner. Therefore, mixing on the basis of the flow of the sample fluid, for instance by diffusion or turbulences, itself is inadequate.

As indicated by an arrow, the magnetic particle 28 is moved counter to the sample fluid and therefore circulates through the latter. This produces a disturbed flow profile 36 with significantly higher velocities on account of the cross section reduced by the magnetic particle 28. This brief increase in the flow velocity leads to turbulences 37 in the sample fluid, whereby circulation is achieved, and the consequent mixing of the sample fluid.

The invention claimed is:

1. A reactor, comprising:
   a reactor chamber (14, 14a, b) of a micro-mechanical construction adapted to be filled with a sample medium containing magnetic particles mixed therein; and
   a generator (20) for a magnetic field which is effective in the interior of the reaction chamber (14, 14a, b) and adapted to be cyclically reversible in its polarity and/or locally variable for causing a motion of the magnetic particles which differs from a motion of the sample medium,
   wherein the reaction chamber is annular.

2. The reactor as claimed in claim 1, wherein the generator is a single rotating permanent magnet, the magnet adapted to be cyclically reversible for generating a cyclically reversible circulating magnetic field in the annular reaction chamber and thereby causing a motion of the magnetic particles to be cyclically reversed.

3. The reactor as claimed in claim 1, wherein, along a length of the annular reaction chamber, a number of adjacent electrical magnetic coils are arranged as generators one after the other along the length, and the adjacent magnet coils adapted to generate a circulating magnetic field in the annular reaction chamber and thereby causing a motion of the magnetic particles to be cyclically reversed.

* * * * *